Figure 1:
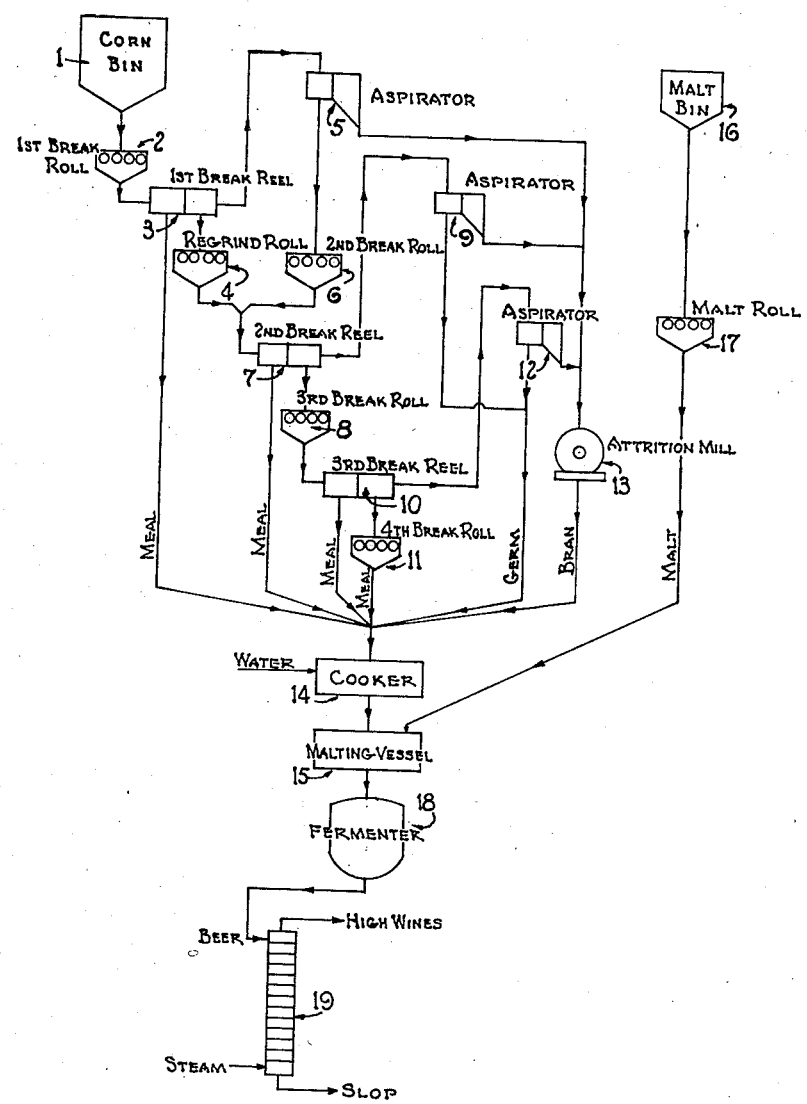

Nov. 1, 1938.  E. J. BOROUGHS  2,135,462
PROCESS FOR RECOVERING MAIZE OIL
Filed June 28, 1937  2 Sheets-Sheet 1

Inventor:
Eugene J. Boroughs
By
Attorney.

Nov. 1, 1938.   E. J. BOROUGHS   2,135,462
PROCESS FOR RECOVERING MAIZE OIL
Filed June 28, 1937   2 Sheets-Sheet 2

Patented Nov. 1, 1938

2,135,462

UNITED STATES PATENT OFFICE 2,135,462

PROCESS FOR RECOVERING MAIZE OIL

Eugene J. Boroughs, Terre Haute, Ind., assignor to Commercial Solvents Corporation, Terre Haute, Ind., a corporation of Maryland Application June 28, 1937, Serial No. 150,710

11 Claims. (Cl. 87—6)

My invention relates to the recovery of maize oil in processes in which a maize-containing grain meal is subjected to a starch conversion treatment to convert the maize starch into water-soluble products without substantially adversely affecting the maize germ.

In the production of bourbon whiskey or similar spirits from whole grain mashes, it has been customary to prepare the mash from finely ground whole grain, thus making the recovery of maize oil impractical. In certin fermentation processes the maize has been degerminated prior to preparing the fermentation mash, but this practice has been limited primarily to the production of neutral spirits, or the like, rather than a bourbon whiskey. For the latter purpose it is generally desirable to include all of the constituents of the maize kernel in the mash in order to obtain improved flavor, or to secure the best activity from the yeast, and to enable the product to be termed a whole grain whiskey. Up to the present time, however, there has been no practical method for recovering maize oil when following this procedure.

Similarly, in the direct fermentation of starch as in the fermentation of starchy mashes by means of the Weizmann bacteria to produce butyl alcohol, acetone, and ethyl alcohol, the maize has been degerminated prior to preparing the mash, with resulting carbohydrate losses, or the mash has been prepared from finely ground whole maize, in which case the recovery of maize oil has been impractical.

Likewise, in the production of malt syrups and in other processes in which maize meal is subjected to a starch conversion treatment to transform the starch into water-soluble products, the procedures previously employed for recovering maize oil have involved the use of complicated degerminating processes, have necessitated the use of expensive machinery and have often been inefficient from the standpoint of carbohydrate recovery. For example, in the production of malt syrups of the type sometimes referred to as "maltose syrups", in which maize is utilized as a source of carbohydrate, it has been customary to degerminate the maize prior to malting. This process has been expensive in itself and has had the further disadvantage that a certain amount of the starch was removed with the germ, thus decreasing the final sugar content of the syrup. Up to the present time, however, there has been suggested no more advantageous method of recovering maize oil in processes of this nature.

One object of my invention, therefore, is to provide a method for the recovery of maize oil in processes in which a grain meal containing both the starch and germ portions of maize is subjected to a starch conversion treatment to convert the maize starch into water-soluble products without substantially adversely affecting the maize germ.

A further object of my invention is to provide a method for the recovery of maize oil in processes in which maize meal containing both the starch and germ portions of the maize kernel is saccharified to transform the starch into sugars.

Another object of my invention is to provide a process in which all of the constituents of the maize kernel are included in a starch or saccharified starch mash, and in which the maize oil is subsequently obtained by extraction from the oil bearing portions of the kernel recovered from the fermentation residue.

A further object of my invention is to provide a method for preparing a mash containing all of the constituents of the maize kernel in such form as to make possible a satisfactory recovery of germ from the final distillation slop.

Another object of my invention is to provide a method for separating the maize germ from the solids in the distillation slop from a maize-containing mash and recovering oil therefrom.

A still further object of my invention is to provide a substantially starch-free grain residue containing whole or only partially broken maize germs, useful as a source of maize oil.

Other objects and advantages of my invention will be evident from the following description and specific examples.

The process of my invention comprises, briefly, preparing a maize-containing grain meal in which the maize germ is left whole or only slightly broken and the starchy portion is more finely divided, subjecting said meal to a starch conversion treatment to transform the maize starch to water-soluble materials without substantially adversely affecting the maize germ, separating germ particles from the residue resulting from the starch conversion treatment, and recovering oil from the germ particles thus obtained.

It will be evident that the preparation of the grain meal for this purpose may be accomplished in a number of different ways. For example, the maize could be completely degerminated by either the wet or dry process and the germ added to the meal prepared from the remainder of the maize prior to the starch conversion treatment. For simplicity and economy of operation, however, I prefer to prepare the meal by comminuting the maize kernel with minimum disruption of the germ, and omitting the unnecessary precaution of obtaining a clean separation of germ and starch particles. Since the starch will be completely removed from the germ in the subsequent starch conversion operations a certain amount of starch adhering to the germ particles will be permissible, and it will therefore be unnecessary to include the expensive steps of tempering the grain and degerminating the tempered grain in the usual manner.

It will likewise be evident that the recovery of the germ from the residue after the starch conversion treatment may be accomplished in a number of different ways. For example, the germ could be recovered from a distillation slop, or similar liquid residue, by adjusting the specific gravity of the liquid to the proper value and floating off the germ according to the well known method employed in wet degermination processes. However, for simplicity and economy of operation I prefer to recover the germ containing residue in a dry form and to secure a concentrated germ fraction therefrom by screening and aspirating.

Figure 2:
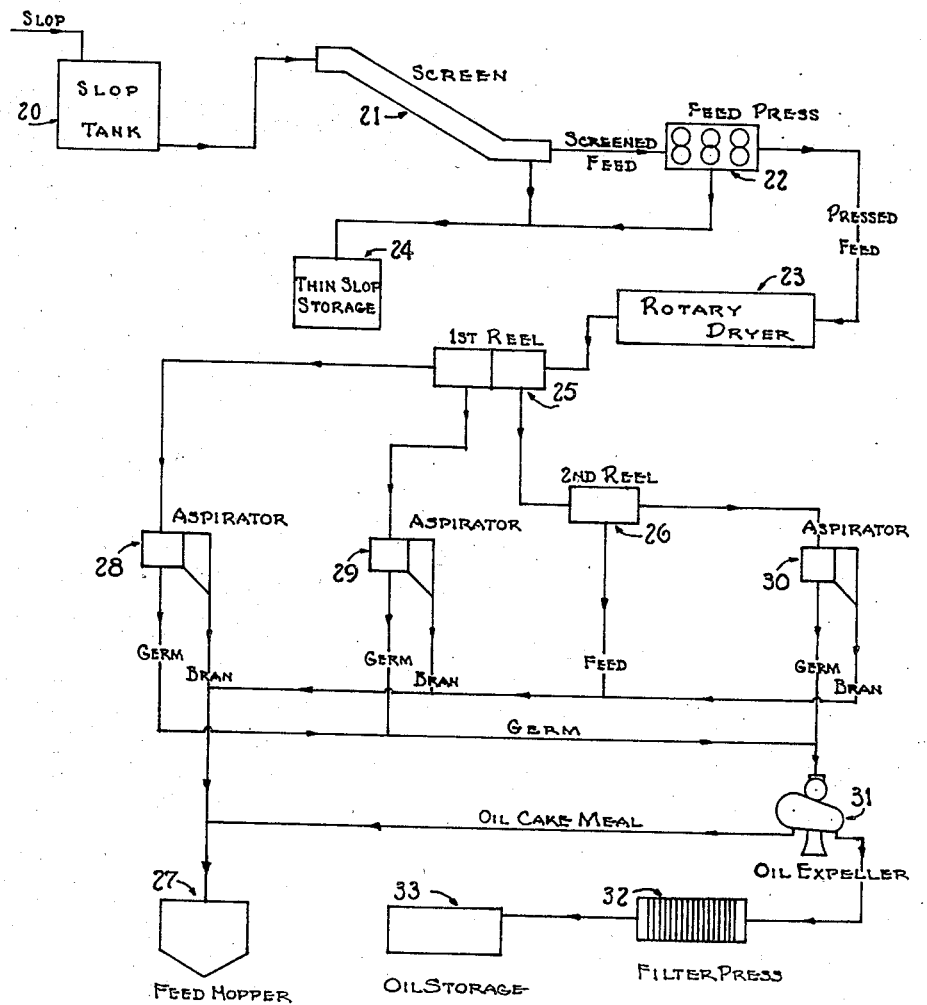

My invention will now be illustrated with reference to its application to one type of starch conversion, namely fermentation of a saccharified starch mash, as illustrated in the flow sheets shown in the accompanying drawings. In these drawings Figure 1 represents the flow sheet for the milling, mashing, fermenting, and distilling steps of a bourbon whiskey process, and Figure 2 represents the flow sheet for the separation of germ from the distillation slop and the recovery of the maize oil from the separated germ.

In this modification of my invention the maize meal is prepared by a series of grinding and classifying operations whereby the starchy portions are finely broken and the germs are maintained in a whole or only partially broken state, but no attempt is made to secure a true separation of the germ from starch particles as in the usual degermination process. The milling operation may be followed in Figure 1 in which it is seen that the maize leaving the bin 1 passes immediately into the first roller mill 2 without the necessity for steeping or tempering operations. The roller mill 2 may comprise any suitable type of mill used for this purpose, but should preferably be fitted with relatively coarsely corrugated rolls, e. g. 6 corrugations per inch, with the rolls spaced sufficiently far apart so as not to break the larger size germs. The ground maize passes from the first break rolls 2 to the first break grading reel 3 which is preferably fitted with the two sizes of wire, e. g., 14 mesh in the first portion and 7 mesh in the second. The meal passing through the 14 mesh wire contains practically no germ or bran and is passed directly to the meal bins or cookers. The material passing through the 7 mesh wire is subjected to a re-grind in the roller mill 4 which is preferably fitted with 14 corrugation rolls. The tailover from the reel 3 passes to a centrifugal aspirator 5 in which the bran is removed, and the residue passes to the second break roll 6 which is preferably fitted with 12 corrugation rolls. The material from the re-grind roll 4 and the second break roll 6 is then further graded in the second break reel 7 which is preferably fitted with 14 mesh wire in the first portion and 8 mesh wire in the second. The meal passing through the 14 mesh wire goes to the meal bins or cookers, and the material passing through the 8 mesh wire goes to the third break roll 8. The tailover from the reel 7 comprises mainly germ and bran which are separated in an aspirator 9, the germ fraction being sent to the meal bins or cookers. The third break roll 8 is preferably fitted with rolls of 14 corrugations per inch and the material leaving this roll is then graded on the third break reel 10 having 14 mesh wire in the first portion and 10 mesh in the second. The meal passing through the 14 mesh wire goes to the meal bins or cookers, and the material from the 10 mesh wire is given a final grind in the fourth break roll 11 which is preferably fitted with 18 corrugation rolls. The material from this roll passes directly to the meal bins or cookers. The tailover from the third break reel 10, comprising mainly germ and bran, passes to an aspirator 12 in which the bran is removed, and the remaining germ fraction is then sent to the meal bins or cookers. The bran removed by the aspirators 5, 9, and 12 is sent to a suitable mill 13, preferably of the attrition type, where it is reduced to a suitable size to be sent to the meal bins or cookers.

It may be seen that the above milling procedure constitutes a simple and efficient method for comminuting the starch and bran portions of the maize kernel with minimum disruption of the germ. Standard milling equipment may be used for this process, and no special degerminators are required for satisfactory results. However, the roller mills should be fitted with rolls adapted to flatten the germ rather than cut or break it. For this purpose saw-tooth corrugations may be employed if the rolls are set "dull to dull" i. e., with the saw-tooth edge leading on the slow roll and following on the fast roll. Similarly, round corrugations might be employed or any of the other types of rolls utilized in degerminating processes.

The meal obtained in the above milling process is next prepared into a mash in any suitable manner and the mash fermented and distilled according to known procedures. This portion of the process is well known in the art and is briefly represented in the flow sheet of Figure 1 by the conventional steps of mashing with water in the cooker 14; saccharifying in a malting vessel 15, with malt kept in a separate supply 16 and ground through a suitable malt roll 17; fermenting the resulting mash in a fermenter 18; and distilling the fermented beer in a beer still 19, from which high wines are removed and a distillation slop is obtained containing the unfermented solid portions of the original grain. It will be evident that these steps of the process can be carried out in any desired manner without affecting the operation of my invention. The mash may include other ingredients, such as various proportions of small grains, and any system of saccharifying, fermenting, and distilling may be employed as long as the distillation slop ultimately contains the relatively unbroken maize germ obtained in the previously described milling process.

The separation of the germ particles from the distillation slop and the recovery of the oil therefrom is shown in the flow sheet of Figure 2 of the drawings. In the modification shown, the solid portion of the distillation slop is recovered in a dry state in the conventional manner for the production of feed from distillation residues, and the germ particles are recovered from this dry feed. Referring to Figure 2, the distillation slop passes from a tank 20 to a suitable screen 21, where the insoluble solids are removed by a simple screening action. This screen may suitably comprise an inclined screen with traveling rakes, or any other form commonly employed in processes for recovering feed from distillation slop. The screened feed then passes to a feed press 22, where the moisture content is further reduced, and then to a drier 23 for final drying. The feed press 22 may comprise a roller press with traveling screen bed, or any other type of press commonly employed for this purpose. The liquid removed by the screen 21 and the feed press 22 may be sent to a storage tank 24 for disposal in any suitable manner, for example, as stock food. The drier 23 may comprise a rotary drum drier of the usual type, or any other suitable apparatus for reducing the moisture content of the feed to a point sufficient to enable the subsequent operations to be carried out. If a subsequent germ drier is not utilized prior to expressing the oil, the feed should be dried at this stage to a sufficient degree to enable the oil expeller to operate satisfactorily on the separated germ. For this purpose, a moisture content of 2 to 4% will generally be quite satisfactory.

The dried feed, obtained as above described or in any other suitable manner, is next treated to separate the germ particles. In the modification illustrated, this is accomplished by screening and aspirating operations. The feed first enters a grading reel 25 which is preferably equipped with 14 mesh wire in the first portion and 10 mesh in the second. The material passing through the 14 mesh wire is introduced into a second grading reel 26, preferably equipped with 20 mesh wire. The feed passing through this reel contains practically no germ and is therefore sent directly to the feed hopper 27. Mixed bran and germ of three size grades are obtained in the tailover from the first grading reel 25, the material passing through the 10 mesh wire of the reel 25, and the tailover from the reel 26. These three grades are separately aspirated in the aspirators 28, 29, and 30, to separate the bran and germ. The bran from the three aspirators passes to the feed hopper 27 together with the material passing through the 20 mesh wire of the reel 26. The germ from the three aspirators is sent to an oil expeller 31 for expressing the oil therefrom. This expeller may be of any suitable type generally employed for this purpose. The resulting oil cake meal may be sent to the feed hopper 27, or may be separately disposed of as protein feed. The oil obtained from the expeller may suitably be filtered in a standard plate and frame press 32, and sent to a storage tank 33 or subjected to such refining as may be desired.

In the process described above the germ stock which is recovered is exceptionally clean and free from starch particles with the result that a better yield of oil is obtained in the expellers. The quality of the oil thus recovered is surprisingly good, being equal to, or slightly better than, that obtained in the previously employed degermination processes as applied to the grain prior to starch conversion. The oil obtained in my process is completely satisfactory from the standpoint of color, odor, and acidity and may readily be refined for food purposes.

When utilizing the specific process described above, yields of the order of three-fourths pound of oil per bushel of corn are readily obtainable. However, it will be evident to one skilled in the art that numerous modifications and improvements could be employed to increase the yield. For example, by inserting a germ drier in the system preceding the oil expeller, it would be possible to utilize feed of a slightly higher moisture content, e. g., 7 to 8%, with resulting improved separation of germ. Numerous other modifications in the process will naturally occur to one skilled in the art.

It is to be understood, of course, that while the process described above represents the preferred procedure for carrying out my invention, my invention is not to be construed as limited to these specific types of operations. Both the milling and the final germ recovery may be effected by any procedures which will produce a meal in which the maize germ is relatively unbroken, and which will separate the germ from the residue subsequently obtained in the process after starch conversion. Likewise the oil recovery step could be modified in numerous respects, as, for example, by extracting with solvents instead of expressing the oil in an expeller.

It should further be understood that my invention is not limited to processes such as the bourbon whiskey process of the above example, in which a saccharified grain mash is fermented. My invention is equally applicable to other processes in which a maize-containing grain meal is subjected to a starch conversion treatment to convert the maize starch to water-soluble products without substantially adversely affecting the maize germ. For example, my invention is applicable to fermentation processes in which the maize starch is directly fermented by starch fermenting micro-organisms. Thus, a fermentation mash may be prepared in accordance with the above example, omitting the malting operation, and such a mash may then be fermented by means of bacteria of the type *Clostridium acetobutylicum* (Weizmann) to produce butyl alcohol, acetone, and ethyl alcohol, or by means of bacteria of the type *Bacillus acetoethylicum* to produce acetone and ethyl alcohol. In such cases the solvents produced may be recovered from the fermented mash by steam distillation in the usual beer still employed for this purpose, and the subsequent operations for separation of the maize germ from the distillery slop and recovery of oil therefrom are then identical with the procedure described above with reference to the bourbon whiskey process.

It will also be evident that my invention is applicable to starch conversion processes which do not involve fermentation. Thus, a maize meal prepared in accordance with the above example may be utilized for the preparation of malt syrups by the usual malt treatment, in which case the germ-containing residue may be separated from the soluble products by screening, centrifuging, or the like, and the germ may then be recovered from this residue in a manner similar to the recovery from the distillery s'op residues. Likewise, a maize meal prepared in accordance with the foregoing example may be subjected to an acid hydrolysis to produce soluble starch, dextrins, or sugars, and in such cases the separation of the germ-containing residue and the recovery of oil therefrom may be effected in accordance with the same procedure utilized in the malt syrup processes.

It will be apparent from the above discussion that my invention is applicable to any process in which a maize-containing grain meal is subjected to a starch conversion treatment to convert the starch to water-soluble products, and that the products secured may be soluble in water in true solution, as in the case of sugars or fermentation products, or merely in the form of colloidal dispersions as in the case of soluble starch or dextrin. Although the products secured in such procedures are water-soluble, they need not be separated from the germ-containing residue by filtration or screening, but may be separated in any suitable manner which will not adversely affect the maize germ in the residue.

Thus, fermentation products may be separated by distillation if their boiling points are not sufficiently high to give rise to a temperature injurious to the oil-bearing residue, or may be separated by steam distillation if direct distillation would involve unduly high temperatures. Other means of separation which will not substantially adversely affect the maize germ will be apparent to those skilled in the art, as, for example, gravity separation by floating the germ from a liquid reaction product having a suitable specific gravity.

It is to be understood that the various specific applications of my invention discussed above are illustrative only, and in no way limit the scope of the application of this process. My oil recovery procedure may be successfully applied in other starch conversion processes in which a maize-containing grain meal is subjected to a starch conversion treatment to convert the maize starch to water-soluble products without substantially adversely affecting the maize germ, and in which the products secured may thus be separated from the germ-containing residue without adversely affecting the germ or its oil content. Likewise, my invention is not to be construed as limited to the particular operating procedures described in the above examples or illustrated in the drawings. Various equivalent operations or modifications of procedure will naturally occur to one skilled in the art, and these are included in the scope of my invention.

This application is a continuation-in-part of my co-pending application Ser. No. 96,385, filed June 15, 1937.

My invention now having been described, what I claim is:

1. In a process in which a maize-containing grain meal is subjected to a starch conversion treatment to convert the maize starch into water-soluble products without substantially adversely affecting the maize germ, the method for recovering maize oil which comprises breaking maize kernels to free germs in a whole or only partially broken state, separating the whole or only partially broken germs from the broken kernels, breaking the starchy portions of the kernels to a degree of fineness such that germs in whole maize ground to the same degree would be broken into fine particles, incorporating both the finely broken starchy portions and the whole and only partially broken germs in the grain mean to be subjected to the starch conversion treatment, subjecting the resulting meal to a treatment to convert the maize starch into water-soluble products without substantially adversely affecting the maize germ separating germ particles from the product of said starch conversion treatment, and recovering oil from said germ particles.

2. In a process in which a maize-containing grain meal is subjected to a starch conversion treatment to convert the maize starch into water-soluble products without substantially adversely affecting the maize germ, the method for recovering maize oil which comprises subjecting maize to a plurality of grinding and classifying operations, whereby the germs are maintained in a whole or only partially broken state and the starchy portions are broken to a degree of fineness such that germs in whole maize ground to the same degree in a single operation would be broken into fine particles, incorporating both the finely broken starchy portions and the whole and only partially broken germs in the grain meal to be subjected to the starch conversion treatment, subjecting the resulting meal to a treatment to convert the maize starch into water-soluble products without substantially adversely affecting the maize germ, separating germ particles from the product of said starch conversion treatment, and recovering oil from said germ particles.

3. In a process in which a maize-containing grain meal is subjected to a saccharification treatment to transform the starch into sugars, the method for recovering maize oil which comprises breaking maize kernels to free germs in a whole or only partially broken state, separating the whole or only partially broken germs from the broken kernels, breaking the starchy portions of the kernels to a degree of fineness such that germs in whole maize ground to the same degree would be broken into fine particles, incorporating both the finely broken starchy portions and the whole and only partially broken germs in the grain meal to be subjected to the saccharification treatment, subjecting the resulting meal to saccharification to convert the maize starch into sugars, separating germ particles from the product of said saccharification treatment, and recovering oil from said germ particles.

4. In a process in which a maize-containing grain meal is subjected to a saccharification treatment to transform the starch into sugars, the method for recovering maize oil which comprises subjecting maize to a plurality of grinding operations followed by screening and aspirating, whereby the germs are maintained in a whole or only partially broken state and the starchy portions are broken to a degree of fineness such that germs in whole maize ground to the same degree in a single operation would be broken into fine particles, incorporating both the finely broken starchy portions and the whole and only partially broken germs in the grain meal to be subjected to the saccharification treatment, subjecting the resulting meal to a saccharification to convert the maize starch into sugars, separating germ particles from the product of said saccharification treatment, and expressing oil from said germ particles.

5. In a process in which a saccharified maize-containing grain mash is subjected to fermentation to convert the carbohydrate into volatile products and the fermented mash is subjected to distillation to recover said volatile products and distillation slop, the method for recovering maize oil which comprises breaking maize kernels to free germs in a whole or only partially broken state, separating the whole or only partially broken germs from the broken kernels, breaking the starchy portions of the kernels to a degree of fineness such that germs in whole maize ground to the same degree would be broken into fine particles, incorporating both the finely broken starchy portions and the whole and only partially broken germs in the grain mash to be subjected to saccharification, saccharifying the resulting mash, subjecting the saccharified mash to fermentation, distilling the fermented mash to recover volatile products and distillation slop, separating germ particles from the resulting distillation slop, and recovering oil from said germ particles.

6. In a process in which a saccharified maize-containing grain mash is subjected to fermentation to convert the carbohydrate into volatile products and the fermented mash is subjected to distillation to recover said volatile products and distillation slop, the method for recovering maize oil which comprises subjecting maize to a plurality of grinding operations followed by screening and aspirating, whereby the germs are maintained in a whole or only partially broken state and the starchy portions are broken to a degree of fineness such that germs in whole maize ground to the same degree in a single operation would be broken into fine particles, incorporating both the finely broken starchy portions and the whole and only partially broken germs in the grain mash to be subjected to saccharification, saccharifying the resulting mash, fermenting the saccharified mash, distilling the fermented mash to recover volatile products and distillation slop, separating an insoluble germ-containing residue from the resulting distillation slop, drying said residue, separating germ particles therefrom by screening and aspirating, and expressing oil from said germ particles.

7. In a process in which a maize-containing grain mash is subjected to fermentation by means of starch fermenting micro-organisms to convert the starch into volatile products and the fermented mash is subjected to distillation to recover said volatile products and distillation slop, the method for recovering maize oil which comprises breaking maize kernels to free germs in a whole or only partially broken state, separating the whole or only partially broken germs from the broken kernels, breaking the starchy portions of the kernels to a degree of fineness such that germs in whole maize ground to the same degree would be broken into fine particles, incorporating both the finely broken starchy portions and the whole and only partially broken germs in the grain mash to be subjected to fermentation, fermenting the resulting mash, distilling the fermented mash to recover volatile products and distillation slop, separating germ particles from the resulting distillation slop, and recovering oil from said germ particles.

8. In a process in which a maize-containing grain mash is subjected to fermentation by means of starch fermenting micro-organisms to convert the starch into volatile products and the fermented mash is subjected to distillation to recover said volatile products and distillation slop, the method for recovering maize oil which comprises subjecting maize to a plurality of grinding operations followed by screening and aspirating, whereby the germs are maintained in a whole or only partially broken state and the starchy portions are broken to a degree of fineness such that whole maize ground to the same degree in a single operation would be broken into fine particles, incorporating both the finely broken starchy portions and the whole and only partially broken germs in the grain mash to be subjected to fermentation, fermenting the resulting mash, distilling the fermented mash to recover volatile products and distillation slop, separating an insoluble germ-containing residue from the resulting distillation slop, drying said residue, separating germ particles therefrom by screening and aspirating, and expressing oil from said germ particles.

9. In a process in which a maize-containing grain meal is subjected to a saccharification treatment to transform the starch into sugars, the method for recovering maize oil which comprises breaking maize kernels to free germs in a whole or only partially broken state, separating whole or only partially broken germs from the broken gernels, comminuting the starchy portions of the kernels to a degree of fineness such that germs in whole maize comminuted to the same degree would be broken into fine particles, incorporating both the comminuted starchy portions and the whole and only partially broken germs in the grain meal to be subjected to the saccharification treatment, subjecting the resulting meal to saccharification, maintaining the germs in a whole or only partially broken state during the said saccharification treatment, separating germ particles from the product of the said saccharification treatment, and recovering oil from said germ particles.

10. In a process in which a mash prepared from a saccharified maize-containing grain meal is subjected to fermentation to transform the carbohydrate to volatile products, and the fermented mash is subjected to distillation to recover said volatile products and distillation slop, the method for recovering maize oil which comprises breaking maize kernels to free germs in a whole or only partially broken state, separating whole or only partially broken germs from the broken kernels, comminuting the starchy portions of the kernels to a degree of fineness such that germs in whole maize comminuted to the same degree would be broken into fine particles, incorporating both the comminuted starchy portions and the whole or only partially broken germs in the grain meal to be incorporated in the mash for the said fermentation, saccharifying said meal to form a saccharified grain mash, fermenting said mash, distilling the resulting fermented mash to obtain volatile products and distillation slop, maintaining the germs in a whole or only partially broken state during the said saccharification, fermentation and distillation operations, separating germ particles from the said distillation slop, and recovering oil from said germ particles.

11. In a process for the production of whiskey by the fermentation of a saccharified maize-containing grain mash including all of the constituents of the maize kernel, and distillation of the fermented mash to recover an alcoholic distillate and distillation slop, the method for recovering maize oil which comprises breaking maize kernels to free germs in a whole or only partially broken state, separating whole or only partially broken germs from the broken kernels, comminuting the starchy portions of the kernels to a degree of fineness such that germs in whole maize comminuted to the same degree would be broken into fine particles, incorporating both the comminuted starchy portions and the whole or only partially broken germs in the grain meal to be incorporated in the mash for the said fermentation, saccharifying said grain meal to form a saccharified grain mash, fermenting the resulting mash with yeast, distilling the fermented mash to recover an alcoholic distillate and distillation slop, maintaining the germs in a whole or only partially broken state during the said saccharification, fermentation, and distillation operations, separating an insoluble germ containing residue from the said distillation slop, drying said residue, separating germ particles from said residue, and expressing oil from said germ particles.

EUGENE J. BOROUGHS.